(12) United States Patent
Dalsgaard et al.

(10) Patent No.: US 9,843,980 B2
(45) Date of Patent: Dec. 12, 2017

(54) METHOD AND APPARATUS FOR CELL RESELECTION

(71) Applicant: Nokia Technologies Oy, Espoo (FI)

(72) Inventors: Lars Dalsgaard, Oulu (FI); Yang Liu, Beijing (CN); Haitao Li, Beijing (CN); Kodo Shu, Shanghai (CN)

( * ) Notice: Subject to any disclaimer, the term of this patent is extended or adjusted under 35 U.S.C. 154(b) by 213 days.

(21) Appl. No.: 14/761,424

(22) PCT Filed: Jan. 24, 2013

(86) PCT No.: PCT/CN2013/070938
§ 371 (c)(1),
(2) Date: Jul. 16, 2015

(87) PCT Pub. No.: WO2014/113953
PCT Pub. Date: Jul. 31, 2014

(65) Prior Publication Data
US 2015/0327144 A1    Nov. 12, 2015

(51) Int. Cl.
*H04W 36/30* (2009.01)
*H04W 48/18* (2009.01)
*H04W 48/12* (2009.01)

(52) U.S. Cl.
CPC ........... *H04W 36/30* (2013.01); *H04W 48/18* (2013.01); *H04W 48/12* (2013.01)

(58) Field of Classification Search
None
See application file for complete search history.

(56) References Cited

U.S. PATENT DOCUMENTS 9,628,251 B2 *   4/2017   Lin .................... H04L 5/14
2006/0166694 A1  7/2006   Jeong et al.
2008/0045262 A1* 2/2008   Phan ................ H04W 36/0083
                                                          455/525

(Continued)

FOREIGN PATENT DOCUMENTS

CN   1863370       11/2015
GB   2490968 A     11/2012

(Continued)

OTHER PUBLICATIONS

Office action received for corresponding Japanese Patent Application No. 2015-554002, dated Feb. 21, 2017, 4 pages of office action and 5 pages of office action translation available.

(Continued)

*Primary Examiner* — Jay P Patel
(74) *Attorney, Agent, or Firm* — Alston & Bird LLP

(57) ABSTRACT

Various embodiments of the present invention provide a method for cell reselection, comprising: receiving, at a user equipment, system information from a network node that is shared by two or more operator networks, wherein the system information comprises first information associated with at least one operator network related to one or more neighboring cells for the user equipment; determining whether there is an operator network accessible to the user equipment in the at least one operator network, based at least in part on the first information; and performing a cell reselection procedure only when one or more accessible operator networks are determined.

19 Claims, 8 Drawing Sheets

(56) References Cited

U.S. PATENT DOCUMENTS

| | | | | |
|---|---|---|---|---|
| 2008/0102896 | A1* | 5/2008 | Wang | H04W 36/34 455/560 |
| 2010/0074235 | A1* | 3/2010 | Sebire | H04J 11/0093 370/338 |
| 2010/0105380 | A1* | 4/2010 | Attar | H04W 48/16 455/434 |
| 2011/0117916 | A1 | 5/2011 | Dahlen | |
| 2012/0100848 | A1 | 4/2012 | Miklos | |
| 2012/0214493 | A1 | 8/2012 | Suh et al. | |
| 2013/0121298 | A1* | 5/2013 | Rune | H04L 29/12066 370/329 |
| 2013/0183971 | A1* | 7/2013 | Tamaki | H04W 36/0061 455/436 |
| 2014/0003233 | A1* | 1/2014 | Rune | H04L 47/125 370/230 |
| 2014/0146696 | A1* | 5/2014 | Lin | H04W 72/12 370/252 |
| 2015/0250013 | A1* | 9/2015 | Li | H04W 72/0426 370/312 |

FOREIGN PATENT DOCUMENTS

| | | |
|---|---|---|
| JP | 2011-109710 A | 6/2011 |
| JP | 2012-253799 A | 12/2012 |
| JP | 2014-518019 A | 7/2014 |
| TW | 201246960 | 11/2012 |
| WO | 2008/041816 A1 | 4/2008 |
| WO | 2010063596 | 6/2010 |
| WO | 2012/009557 A2 | 1/2012 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304, V11.1.0, Sep. 2012, pp. 1-33.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.1.0, Sep. 2012, pp. 1-325.

"Mobility Management", Oocities, Retrieved on Sep. 23, 2016, Webpage available at : http://www.oocities.org/gsmmobilereport/mobilemanagement.htm.

Office action received for corresponding Japanese Patent Application No. 2015-554002, dated Aug. 22, 2016, 4 pages of office action and 6 pages of office action translation available.

"UMTS-LTE Interworking Scenarios", 3GPP TSG-RAN WG3 Meeting #79, R3-130209, Agenda item: 15, LG Electronics Inc., Jan. 28-Feb. 1, 2013, 2 pages.

"3rd Generation Partnership Project; Technical Specification Group Services and System Aspects; Network Sharing; Architecture and functional description(Release 11)", 3GPP TS 23.251, V11.4.0, Dec. 2012, pp. 1-34.

International Search Report and Written Opinion received for corresponding Patent Cooperation Treaty Application No. PCT/CN2013/070938 , dated Oct. 31, 2013, 12 pages.

3GPP TSG-RAN WG3 Meeting #79; R3-130209; "UMTS-LTE Interworking Scenarios"; Agenda Item 15; Source LG Electronics Inc.; <URL:http://www.3gpp.org/ftp/tsg_ran/WG3_lu/TSGR3_79/Docs/R3-130209.zip>, Malta, Malta; Jan. 28-Feb. 1, 2013; 2 pages.

Office Action from Japanese Patent Application No. 2015-554002, dated Sep. 7, 2017, 11 pages.

* cited by examiner

```
       IE 400
SystemInformationBlockType4 ::=    SEQUENCE {
   intraFreqNeighCellList          IntraFreqNeighCellList
   OPTIONAL,   -- Need OR
   intraFreqBlackCellList          IntraFreqBlackCellList
   OPTIONAL,   -- Need OR
   csg-PhysCellIdRange             PhysCellIdRange         OPTIONAL, --
Cond CSG
   additional-plmn-IdentityList    PLMN-IdentityList   OPTIONAL, ...,
   lateNonCriticalExtension        OCTET STRING            OPTIONAL    --
Need OP
}
   PLMN-IdentityList ::=           SEQUENCE (SIZE (1..6)) OF PLMN-
IdentityInfo PLMN-IdentityInfo ::=           SEQUENCE {
     plmn-Identity                 PLMN-Identity,
     cellReservedForOperatorUse    ENUMERATED {reserved,
notReserved}
   }
```

Figure 4

```
                         IE 500
SystemInformationBlockType5 ::=   SEQUENCE {
   interFreqCarrierFreqList      InterFreqCarrierFreqList,
   ...,
   lateNonCriticalExtension      OCTET STRING (CONTAINING
SystemInformationBlockType5-v8h0-IEs)           OPTIONAL -- Need OP
}
InterFreqCarrierFreqList ::=    SEQUENCE (SIZE (1..maxFreq)) OF
InterFreqCarrierFreqInfo InterFreqCarrierFreqInfo ::=  SEQUENCE {
   dl-CarrierFreq           ARFCN-ValueEUTRA,
   q-RxLevMin               Q-RxLevMin,
   p-Max                    P-Max                       OPTIONAL,    -- Need
OP
   t-ReselectionEUTRA       T-Reselection,
   t-ReselectionEUTRA-SF    SpeedStateScaleFactors
OPTIONAL,       -- Need OP
   threshX-High             ReselectionThreshold,
   threshX-Low              ReselectionThreshold,
   allowedMeasBandwidth     AllowedMeasBandwidth,
   presenceAntennaPort1     PresenceAntennaPort1,
   cellReselectionPriority     CellReselectionPriority
OPTIONAL,       -- Need OP
   neighCellConfig          NeighCellConfig,
   q-OffsetFreq             Q-OffsetRange              DEFAULT dB0,
   interFreqNeighCellList      InterFreqNeighCellList
OPTIONAL,       -- Need OR
   interFreqBlackCellList      InterFreqBlackCellList
OPTIONAL,       -- Need OR
   additional-plmn-IdentityList    PLMN-IdentityList
   ......
}
   PLMN-IdentityList ::=         SEQUENCE (SIZE (1..6)) OF PLMN-
IdentityInfo PLMN-IdentityInfo ::=       SEQUENCE {
         plmn-Identity            PLMN-Identity,
         cellReservedForOperatorUse    ENUMERATED {reserved,
notReserved}
```

Figure 5

```
                        IE 600
SystemInformationBlockType6 ::=         SEQUENCE {
    carrierFreqListUTRA-FDD             CarrierFreqListUTRA-FDD     OPTIONAL,       -- Need OR
    carrierFreqListUTRA-TDD             CarrierFreqListUTRA-TDD     OPTIONAL,       -- Need OR
    t-ReselectionUTRA                   T-Reselection,
    t-ReselectionUTRA-SF                SpeedStateScaleFactors      OPTIONAL,       -- Need OP
    ...,
    lateNonCriticalExtension            OCTET STRING    (CONTAINING SystemInformationBlockType6-v8h0-IEs)
        OPTIONAL    -- Need OP
}

SystemInformationBlockType6-v8h0-IEs ::=    SEQUENCE {
    carrierFreqListUTRA-FDD-v8h0 SEQUENCE (SIZE (1..maxUTRA-FDD-Carrier)) OF CarrierFreqInfoUTRA-FDD-v8h0 OPTIONAL,
Need OR
    nonCriticalExtension                SEQUENCE {}                 OPTIONAL    -- Need OP
}

CarrierFreqListUTRA-FDD ::=     SEQUENCE (SIZE (1..maxUTRA-FDD-Carrier)) OF CarrierFreqUTRA-FDD CarrierFreqUTRA-FDD ::=         SEQUENCE {
    carrierFreq                         ARFCN-ValueUTRA,
    cellReselectionPriority             CellReselectionPriority     OPTIONAL,       -- Need OP
    threshX-High                        ReselectionThreshold,
    threshX-Low                         ReselectionThreshold,
    q-RxLevMin                          INTEGER (-60..-13),
    p-MaxUTRA                           INTEGER (-50..33),
    q-QualMin                           INTEGER (-24..0),
```
| additional-plmn-IdentityList | PLMN-IdentityList |
```
    ...,
    [[ threshX-Q-r9                     SEQUENCE {
            threshX-HighQ-r9                ReselectionThresholdQ-r9,
            threshX-LowQ-r9                 ReselectionThresholdQ-r9
        }                                                           OPTIONAL    -- Cond RSRQ
    ]]
}
```
| PLMN-IdentityList : :=      SEQUENCE (SIZE(1..6)) of PLMN-IdentityInfo |
| --- |
| PLMN-IdentityInfo ::=      SEQUENCE { |
|      plmn-Identity      PLMN-Identity, |
|      cellReservedForOperatorUse      ENUMERATED {reserved, notReserved} |
| ... |
| } |

```
                    IE 700
SystemInformationBlockType4 ::=    SEQUENCE {
   intraFreqNeighCellList          IntraFreqNeighCellList
   OPTIONAL,  -- Need OR
   intraFreqBlackCellList          IntraFreqBlackCellList
   OPTIONAL,  -- Need OR
   csg-PhysCellIdRange             PhysCellIdRange      OPTIONAL, --
Cond CSG
   ...,
   lateNonCriticalExtension        OCTET STRING         OPTIONAL    --
Need OP
}

IntraFreqNeighCellList ::=    SEQUENCE (SIZE (1..maxCellIntra)) OF
IntraFreqNeighCellInfo IntraFreqNeighCellInfo ::=    SEQUENCE {
   physCellId                PhysCellId,
   q-OffsetCell              Q-OffsetRange,
   additional-plmn-IdentityList       PLMN-IdentityList }
   PLMN-IdentityList ::=          SEQUENCE (SIZE (1..6)) OF PLMN-
IdentityInfo PLMN-IdentityInfo ::=        SEQUENCE {
         plmn-Identity            PLMN-Identity,
         cellReservedForOperatorUse    ENUMERATED {reserved,
notReserved}

```
        IE 800
SystemInformationBlockType5 ::=    SEQUENCE {
  interFreqCarrierFreqList        InterFreqCarrierFreqList,
  ...,
  lateNonCriticalExtension        OCTET STRING (CONTAINING
SystemInformationBlockType5-v8h0-IEs)        OPTIONAL -- Need OP
}
InterFreqCarrierFreqList ::=    SEQUENCE (SIZE (1..maxFreq)) OF
InterFreqCarrierFreqInfo InterFreqCarrierFreqInfo ::=    SEQUENCE {
  dl-CarrierFreq            ARFCN-ValueEUTRA,
  q-RxLevMin                Q-RxLevMin,
  p-Max                     P-Max                OPTIONAL,     -- Need OP
  t-ReselectionEUTRA        T-Reselection,
  t-ReselectionEUTRA-SF     SpeedStateScaleFactors
  OPTIONAL,    -- Need OP
  threshX-High              ReselectionThreshold,
  threshX-Low               ReselectionThreshold,
  allowedMeasBandwidth      AllowedMeasBandwidth,
  presenceAntennaPort1      PresenceAntennaPort1,
  cellReselectionPriority   CellReselectionPriority
  OPTIONAL,    -- Need OP
  neighCellConfig           NeighCellConfig,
  q-OffsetFreq              Q-OffsetRange            DEFAULT dB0,
  interFreqNeighCellList    InterFreqNeighCellList
  OPTIONAL,    -- Need OR
  interFreqBlackCellList    InterFreqBlackCellList
  OPTIONAL,    -- Need OR
  ...,
  [[q-QualMin-r9       Q-QualMin-r9          OPTIONAL,   -- Need
OP
    threshX-Q-r9       SEQUENCE {
      threshX-HighQ-r9     ReselectionThresholdQ-r9,
      threshX-LowQ-r9      ReselectionThresholdQ-r9
    }                           OPTIONAL    -- Cond RSRQ
  ]]
}
InterFreqNeighCellList ::=      SEQUENCE (SIZE (1..maxCellInter))
OF InterFreqNeighCellInfo InterFreqNeighCellInfo ::=      SEQUENCE {
  physCellId                PhysCellId,
  q-OffsetCell              Q-OffsetRange
  additional-plmn-IdentityList    PLMN-IdentityList
}
  PLMN-IdentityList ::=          SEQUENCE (SIZE (1..6)) OF PLMN-
IdentityInfo PLMN-IdentityInfo ::=          SEQUENCE {
    plmn-Identity               PLMN-Identity,
    cellReservedForOperatorUse     ENUMERATED {reserved,
notReserved}
}
```

Figure 8 ns# METHOD AND APPARATUS FOR CELL RESELECTION

RELATED APPLICATION

This application was originally filed as PCT Application No. PCT/CN2013/070938 filed Jan. 24, 2013.

FIELD OF THE INVENTION

Example and non-limiting embodiments of this invention relate generally to communications networks, and more particularly to cell reselection in a communication system with the sharing of a radio access network (RAN) among multiple public land mobile networks (PLMNs).

BACKGROUND OF THE INVENTION

In the future, it is foreseen that there will be a huge increase in the wireless data transmission using wireless networks and wireless connections. In order to handle this big increase in wireless data, the discussion is going towards a need for smaller cell sizes and more efficient network offloading opportunities by use of e.g. hotspots. Work is ongoing internally in some companies and also in open forums like 3rd Generation Partnership Project (3GPP) on how to enable efficient sharing of a RAN in order to allow different operators to share the RAN.

RAN sharing is not new, but in the future it is likely to even further share a RAN in order to keep operators cost low while still ensuring offloading by small cells (and still have a reasonable number of eNBs deployed in the environment). When a small cell RAN is shared (e.g. on 3.5 GHz carrier), it does not necessarily mean that a macro RAN (e.g. large area coverage) is shared among the operators that share the small cell RAN (hotspot RAN).

One problem arises in such configuration when idle mode (or similar) mobility is supported. Assuming that the idle mode mobility will be similar as in legacy, the mobility related information for idle mode mobility is based on broadcast information—i.e. information received by all user equipments (UEs). In such scenario, it is not possible to distinguish UEs e.g. based on their release version or their Home Public Land Mobile Network (HPLMN). Therefore, all UEs will receive all the broadcast information including also mobility related information.

As illustrated in FIG. 1, the problem arises when there are two UEs: UE 1 with subscription to PLMN 1 and UE 2 with subscription to PLMN 2. An access point (AP) is shared between the two PLMNs but the macro network is only accessible to UEs with correct subscription. That is, UE 1 cannot access eNB 2 deployed in PLMN 2 and UE 2 cannot access eNB 1 deployed in PLMN 1.

On the other hand, the mobility information broadcast by the AP has to include carrier information for both carriers of eNB 1 and eNB 2 (different carriers) as it has to be the information enabling mobility for both UE 1 and UE 2. The UEs cannot distinguish the mobility information and as a result, UE 1 will search, detect and measure cells from PLMN 2 (on carrier 2) in mobility evaluation although access is not allowed, and similarly UE 2 will search, detect and measure cells from PLMN 1 (on carrier 1) in mobility evaluation. This scenario leads to a number of unnecessary reselections and possibly also unnecessary signaling.

3GPP TS 36.304 describes the idle mode mobility of a UE, and 3GPP TS 36.331 defines the system information required for supporting idle mode reselection procedures. However, the 3GPP TS 36.331 assumes that an access network is connected to one PLMN that is under control of a single network operator. Therefore, the system information stated therein is not involving any information associated with PLMNs sharing a same RAN.

SUMMARY OF THE INVENTION

Example embodiments of the present invention propose a method to enable a UE at an early stage to distinguish accessible carriers from non-accessible carriers. A UE could be able to distinguish whether an intra-freq/inter-freq measurement to a neighboring cell should be initiated or not, which could save unnecessary measurements and possibly signaling in the Uu interface for the UE. Via such knowledge, a UE could avoid measuring the carrier/cell which is not suitable for itself, during the cell reselection. This will improve the measurement efficiency for idle mode UEs, and reduce power consumption of the UEs.

An aspect of the invention relates to a method for cell reselection. The method comprises: receiving, at a user equipment, system information from a network node that is shared by two or more operator networks, wherein the system information comprises first information associated with at least one operator network related to one or more neighboring cells for the user equipment; determining whether there is an operator network accessible to the user equipment in the at least one operator network, based at least in part on the first information; and performing a cell reselection procedure only when one or more accessible operator networks are determined.

A second aspect of the invention relates to another method. The method comprises: obtaining, at a network node shared by two or more operator networks, first information associated with at least one operator network related to one or more neighboring cells of a user equipment communicatively connected to the network node; and broadcasting the first information in system information to the user equipment.

A third aspect of the invention relates to an apparatus for wireless communications. The apparatus comprises: a transmitter; a receiver; a processor; and at least one memory including program code that, when executed by the processor, cause the apparatus to: receive system information from a network node that is shared by two or more operator networks, wherein the system information comprises first information associated with at least one operator network related to one or more neighboring cells of the apparatus; determine whether there is an operator network accessible to the apparatus in the at least one operator network, based at least in part on the first information; and perform a cell reselection procedure only when one or more accessible operator networks are determined.

A fourth aspect of the invention relates to an apparatus for sharing by two or more operator networks. The apparatus comprises: a transmitter; a receiver; a processor; and at least one memory including program code that, when executed by the processor, cause the apparatus to: obtain first information associated with at least one operator network related to one or more neighboring cells of a user equipment communicatively connected to the apparatus; and broadcast the first information in system information to the user equipment.

BRIEF DESCRIPTION OF DRAWINGS

The invention itself, preferable modes of use and further objectives are best understood by reference to the following detailed description of the embodiments when read in conjunction with the accompanying drawings, wherein like reference numerals generally refer to like elements in the embodiments of the present disclosure.

FIG. 4 is an exemplary description illustrating system information including SystemInformationBlockType4 IE 400 for intra-freq mobility per carrier level according to one embodiment of the present invention;

FIG. 5 is an exemplary description illustrating system information including SystemInformationBlockType5 IE 500 for inter-freq mobility per carrier level according to one embodiment of the present invention;

FIG. 6 is an exemplary description illustrating system information including SystemInformationBlockType6 IE 600 for inter-RAT mobility per carrier level according to one embodiment of the present invention;

FIG. 7 is an exemplary description illustrating system information including SystemInformationBlockType4 IE 700 for intra-freq mobility per cell level according to one embodiment of the present invention;

FIG. 8 is an exemplary description illustrating system information including SystemInformationBlockType4 IE 800 for inter-freq mobility per cell level according to one embodiment of the present invention.

DETAILED DESCRIPTION OF EMBODIMENTS

Figure 1:
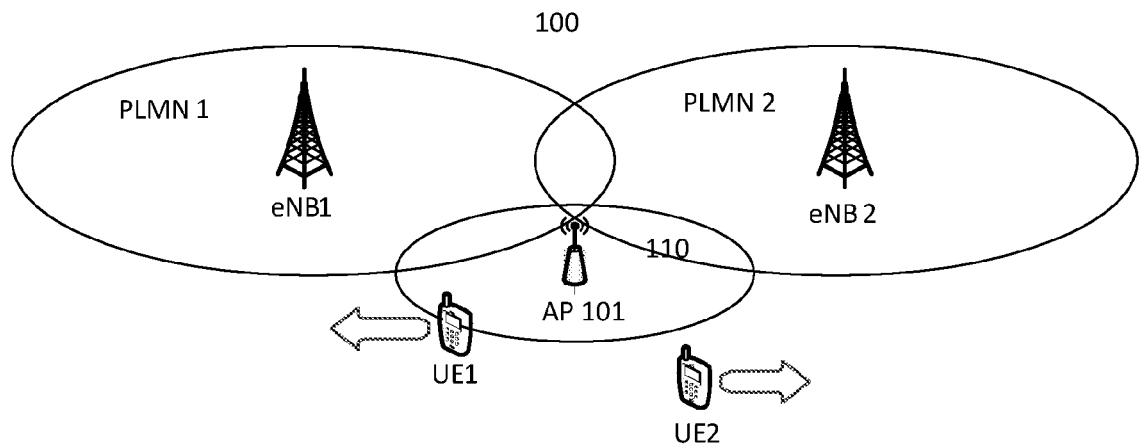
FIG. 1 is an exemplary diagram illustrating a communication system 100 according to embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for thorough and complete understanding of the present disclosure, and completely conveying the scope of the present disclosure to those skilled in the art.

It is to be noted that the following exemplary description mainly refers to specifications being used as non-limiting examples for certain exemplary network configurations and deployments. In particular, Evolved Universal Terrestrial Radio Access Network (E-UTRAN) and Long Term Evolution Hotspot indoor (LET-Hi) are used as non-limiting examples for the applicability of thus described exemplary aspects and embodiments. As such, the description of exemplary aspects and embodiments given herein specifically refers to terminology which is directly related thereto. Such terminology is only used in the context of the presented non-limiting examples, and does naturally not limit the invention in any way. Rather, any other communication systems, bands, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In an E-UTRAN mobile network, a UE in idle mode needs to camp on a cell so as to receive system information from a PLMN, receive paging messages and cell broadcast messages etc. The UE in idle mode already camped on a cell regularly looks to see if there is a better cell. If there is a better one, or if there is a downlink signaling failure etc., a cell reselection occurs. The mobility of a UE in idle mode comprises intra-frequency (intra-freq) mobility and inter-frequency (inter-freq) mobility as well as inter-RAT (Radio Access Technology) mobility. The intra-freq mobility occurs when the current serving cell and the target cell to move to operate on a same carrier frequency. On the other hand, the inter-freq mobility occurs when the target cell to move to operates on a different carrier frequency as compared to the current serving cell. It is similar for the inter-RAT mobility except that the new target cell will be operating in another RAT. During the cell reselection procedure, the network controls a UE to perform measurements for intra/inter-frequency mobility by using broadcast information or dedicated control. The measurements for neighboring cells performed by the UE comprise intra-freq measurements and may also comprise inter-freq measurements and inter-RAT measurements.

FIG. 1 is an exemplary diagram illustrating a communication system 100 according to embodiments of the present invention. The communication system 100 typically comprises a common radio access network 110 shared by two or more operator networks, such as PLMNs. The common radio access network 110 comprises a network node, such as an access point (AP) 101 communicably coupled to two base stations, e.g. eNBs in E-UTRAN, within two PLMNs operated by respective operators. The communication system 100 also comprises multiple UEs, for example UE 1 and UE 2 as shown in FIG. 1. UE 1 and UE 2 have subscribed to PLMN 1 and PLMN 2 respectively. The UEs typically maintain a list of all accessible PLMNs in their Subscriber Identity Module (SIM)/Universal Subscriber Identity Module (USIM) or memory. However, it shall be understood that the number of PLMNs, eNBs and UEs as illustrated in FIG. 1 is only for illustration and shall not be construed as limiting. In one embodiment, the network node may be, but not limited to, LTE-Hi AP or LTE-ELA AP.

Figure 2:
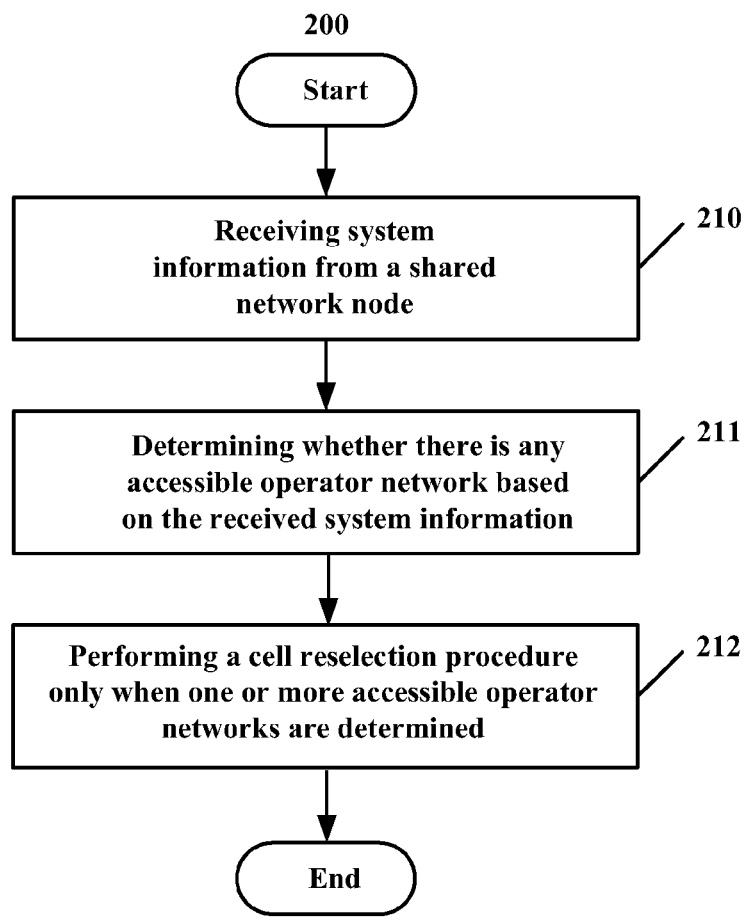
FIG. 2 is an exemplary flowchart of a method 200 for cell reselection used at the UE in the communication system as shown in FIG. 1, according to embodiments of the present invention.

FIG. 2 is an exemplary flowchart of a method 200 for cell reselection employed at the UE in the communication system as shown in FIG. 1, according to embodiments of the present invention. As shown in the figure, in block 210, the UE receives system information from AP 101. The system information comprises PLMN information associated with the PLMN(s) related to neighboring cells of the serving cell for the UE. In one embodiment, the PLMN information comprises a list of PLMNs to which an intra-freq carrier of the neighboring cells belongs. In another embodiment, the PLMN information comprises, for each of inter-freq or inter-RAT carriers, a list of PLMNs to which a corresponding one of the inter-freq/RAT carriers belongs. In yet another embodiment, the PLMN information further comprises information indicating an association between each of the neighboring cells on each of the intra-freq/inter-freq/RAT carriers and the PLMN(s). In this embodiment, if the UE already determines there are accessible PLMNs associated with a given carrier (e.g. an intra-freq or inter-freq/RAT carrier), and if some of the PLMNs associated with that given carrier are accessible while others are not, the UE will further determine which neighboring cells on that given carrier belong to the accessible PLMNs and then perform measurements related to these neighboring cells. In yet another embodiment, the PLMN information comprises a list of PLMNs to which one or more neighboring cells on a single carrier belong. In the following description, illustrative but non limiting examples of the PLMN information will be given with reference to FIGS. 4-8.

Next in block 212, the UE determines whether there is any PLMN accessible to the user equipment in the PLMN(s) involved in the PLMN information. Then in block 214, only when one or more PLMNs are determined to be accessible, may a cell reselection procedure be performed by the UE through for example, performing intra-freq or inter-freq/ RAT cell detection and measurements. Otherwise, no cell reselection procedure will be performed.

Figure 3:
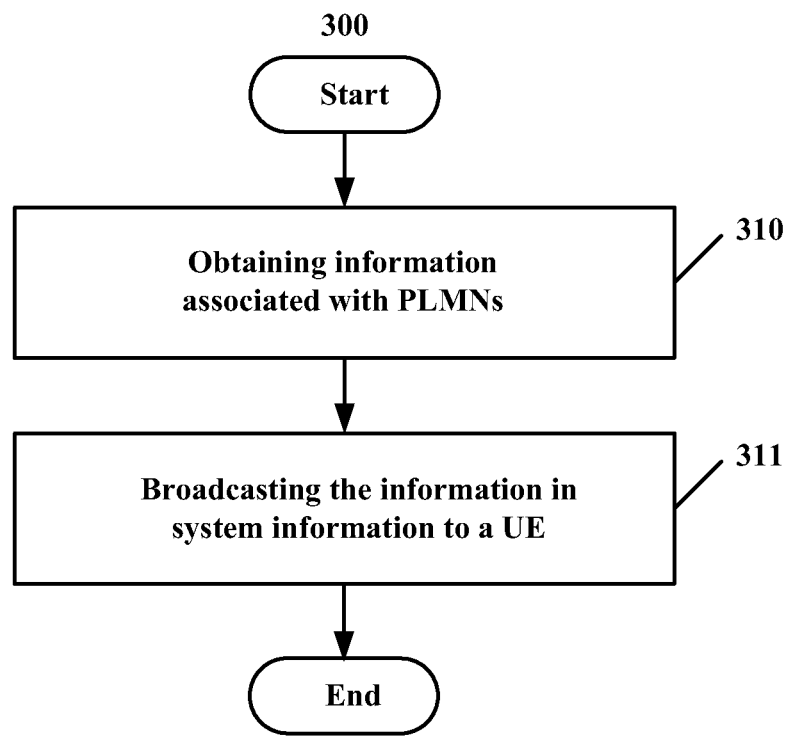
FIG. 3 is an exemplary flowchart of a method 300 for cell reselection used at the access point in the communication system as shown in FIG. 1, according to embodiments of the present invention.

FIG. 3 is an exemplary flowchart of a method 300 for cell reselection employed at the network node, such as access point in the communication system 100 as shown in FIG. 1, according to embodiments of the present invention. As shown in the figure, in block 310, the network node obtains PLMN information associated with the PLMN(s) for each carrier of the neighboring cells or for each of the neighboring cells when setting up interfaces between the network node and neighboring base stations (eNBs). Next in block 312, the network node broadcast the PLMN information in system information to all UEs, for example, via Broadcast Control Channels (BCCHs) or system information blocks (SIBs).

In the following description, illustrative examples of the PLMN information as included in the system information will be exemplarily described with reference to FIGS. 4-8. Examples of the system information are chosen by referring to the 3GPP TS 36.331 in which thirteen types of System Information Blocks have been defined for conveying system information. In that specification, a SystemInformation-BlockType4 information element (IE) is defined to contain neighboring cell related information relevant only for intra-frequency cell reselection and the IE includes cells with specific reselection parameters as well as blacklisted cells; a SystemInformationBlockType5 IE is defined to contain information relevant only for inter-frequency cell reselection i.e. information about other E-UTRA frequencies and the IE may include cell reselection parameters common for a frequency as well as cell specific reselection parameters; a SystemInformationBlockType6 IE is defined to contain information relevant only for inter-RAT cell re-selection, i.e. information about UTRA (Universal Terrestrial RAN) frequencies and UTRA neighbouring cells relevant for cell re-selection; a SystemInformationBlockType7 IE is defined to contain information relevant only for inter-RAT cell re-selection, i.e. information about GERAN (GSM (Global System for Mobile Communications)/EDGE (Enhanced Data rates for GSM Evolution) RAN) frequencies relevant for cell re-selection; a SystemInformationBlockType8 IE is defined to contain information relevant only for inter-RAT cell re-selection, i.e. information about CDMA2000 (Code Division Multiple Access 2000) frequencies and CDMA2000 neighbouring cells relevant forcell re-selection. Hereinafter, SystemInformationBlockType4 IE, SystemInformationBlockType5 IE and SystemInformationBlock-Type6 IE with the PLMN information configured therein will be exemplarily described in ASN.1 as examples of the system information according to the embodiments of the present invention.

FIGS. 4-8 respectively illustrate the PLMN information for intra-frequency mobility per carrier level, inter-frequency mobility per carrier level, inter-RAT mobility per carrier level, intra-frequency mobility per cell level and inter-frequency mobility per cell level.

FIG. 4 is an exemplary description illustrating system information including SystemInformationBlockType4 IE 400 for intra-freq mobility per carrier level according to one embodiment of the present invention. Since an intra-freq carrier may belong to different PLMNs, additional-plmn-IdentityList information is comprised in the IE 400 as shown in FIG. 4 to indicate the association between the intra-freq carrier and the PLMN(s). This information may include, but not limited to, a list of identities of the PLMNs to which the intra-freq carrier belongs. Upon receipt of the IE 400, the UE will check whether an associated PLMN is an allowable PLMN for itself or not, for example, by checking whether the identity of the associated PLMN is included in a list of allowed PLMNs maintained in the UE. If the identity of the associated PLMN is found in the list, it can be determined that the associated PLMN is allowed and thus accessible to the UE. If no accessible PLMN is found, no cell reselection to cells on the intra-freq carrier will be triggered and thus no intra-frequency measurement will be performed.

FIG. 5 is an exemplary description illustrating system information including SystemInformationBlockType5 IE 500 for inter-freq mobility per carrier level according to one embodiment of the present invention. In this embodiment, the IE 500 comprises a list of inter-freq carrier frequencies. For each single inter-freq carrier frequency, additional-plmn-Identitylist information is provided, which includes the PLMN information of that single inter-freq carrier frequency. Such PLMN information indicates the association between that single inter-freq carrier and the PLMN(s), for example, it may comprise a list of identities of the PLMNs to which the single inter-freq carrier belongs. Upon receipt of the IE 500, the UE will check whether an associated PLMN of a given inter-freq carrier is an allowable PLMN, for example, by checking whether the identity of the associated PLMN is included in the list of allowed PLMNs maintained in the UE. If the identity of the associated PLMN is found in the list, it can be determined that the associated PLMN is allowed and thus that given inter-freq carrier is accessible to the UE. If no accessible PLMN is found, the carrier is not accessible by the UE and no cell reselection to that inter-freq carrier should be triggered and thus no inter-freq measurement related to the neighboring cells on that inter-freq carrier would need to be performed. For example, in the scenario as illustrated in FIG. 1, UE 1 with subscription to PLMN 1 (cells on carrier 1) will, while being camped on the AP, be able to know based on the PLMN information received from the AP that the carrier 2, on which eNB 2 operates, belongs to PLMN 2 which is not among the allowed PLMNs. Based on this, the UE can determine that cells on carrier frequency 2 are not suitable for camping hence the UE does not have to perform cell detection and measurements on this carrier, leading to that no cell reselection will be triggered to cells on the carrier frequency 2.

FIG. 6 is an exemplary description illustrating system information including SystemInformationBlockType6 IE 600 for inter-RAT mobility per carrier level according to one embodiment of the present invention. As illustrated, the IE 600 comprises a list of inter-RAT carrier frequencies, and the RAT used in this embodiment refers to UTRAN. For GERAN cases, SystemInformationBlockType7 may be employed and for CDMA2000 cases, SystemInformationBlockType7 may be employed. In the current example as shown in FIG. 6, for each single inter-RAT carrier frequency, additional-plmn-Identitylist information is provided, which includes the PLMN information of that single inter-RAT carrier frequency. Such PLMN information indicates the association between that single inter-RAT carrier and the PLMN(s), for example, it may comprise a list of identities of the PLMNs to which the single inter-RAT carrier belongs. Upon receipt of the IE 600, the UE will check whether an associated PLMN of a given inter-RAT carrier is an allowable PLMN, for example, by checking whether the identity of the associated PLMN is included in the list of allowed PLMNs maintained in the UE. If the identity of the associated PLMN is found in the list, it can be determined that the associated PLMN is allowed and thus that given inter-RAT carrier is accessible to the UE. If no accessible PLMN is found, that given inter-RAT carrier is not accessible by the UE and no cell reselection to that carrier should be triggered and thus no inter-RAT measurement related to the neighboring cells on that carrier would need to be performed.

The PLMN information for each of inter-freq/RAT carriers or intra-freq carrier could be obtained by the AP, e.g. LTE-Hi AP, when setting up interfaces between the AP and neighboring eNBs (e.g. eNB1 and eNB2). Some backhaul procedures known in the art could be utilized to implement such information exchanging, and thus will not be detailed herein.

Alternatively, the PLMN information may be provided per cell level.

FIG. 7 is an exemplary description illustrating system information including SystemInformationBlockType4 IE 700 for intra-freq mobility per cell level according to one embodiment of the present invention. In this embodiment, the IE 700 may comprise a list of intra-freq neighboring cells with specific cell reselection parameters. The intra-freq neighboring cells used herein refer to neighboring cells on the same carrier frequency as the current serving cell of the UE. Taking network sharing in consideration, a single neighboring cell may belong to different PLMNs. Therefore, for each single intra-freq neighboring cell, additional-plmn-Identitylist information is provided to indicate the association between that intra-freq neighboring cell and the PLMNs. Similar to the IE 400 as described with reference to FIG. 4, such information may comprise a list of identities of the PLMNs to which the single intra-freq neighboring cell belongs. From UE's point of view, the UE will base on this information to tell to which PLMN a given intra-freq neighboring cell belongs and thereby determine whether the potential target PLMN is an allowable one or not. If no accessible PLMN is found, then no reselection to that intra-freq neighboring cell will happen. However, the indication of the association between a neighboring cell and the PLMNs is not limited to listing the PLMN information for each cell in a list. Alternatively, it can be implemented by either making a list of cells operated by the PLMNs in the list or making for each PLMN in the list a list of cells operated by that PLMN. But more changes to the ASN.1 would be required.

FIG. 8 is an exemplary diagram illustrating system information including SystemInformationBlockType5 IE 800 for inter-freq mobility per cell level according to one embodiment of the present invention. In this embodiment, the IE 800 comprises a list of inter-freq carrier frequencies. For each single carrier frequency, a list of inter-freq neighboring cells is provided, and further, for each single inter-freq neighboring cell, additional-plmn-Identitylist information is provided to indicate the association between the inter-freq neighboring cell on that single inter-freq carrier and the PLMNs. From UE's point of view, the UE will base on this information to tell which PLMN a given inter-freq neighboring cell on a given inter-freq carrier belongs to and thereby determine whether the potential target PLMN is an allowable one or not. If no accessible PLMN is found, then no reselection to that given inter-freq neighboring cell on that given inter-freq carrier will happen and no inter-freq measurement related to that inter-freq neighboring will be performed.

As for the inter-RAT mobility per cell level, a SystemInformationBlockType6, 7 or 8 IE may also be used in the similar way as illustrated in FIG. 8 such that the PLMN information indicating the association between inter-RAT neighboring cells and the PLMNs is comprised in the IE, which will not be detailed herein for the sake of conciseness.

In the foregoing, the system information comprises the PLMN information either per carrier level or per cell level. However, the system information can comprise the PLMN information per both carrier and cell levels. For example, the PLMN information may combine the additional-plmn-Identitylist information as included in the IE 400 and the additional-plmn-Identitylist information as included in the IE 700 or combine the additional-plmn-Identitylist information as included in the IE 500 and the additional-plmn-Identitylist information as included in the IE 800. In this example, upon receipt of the PLMN information, the UE first determines whether there is an accessible PLMN associated with a given carrier (intra-freq or inter-freq carrier). If no accessible PLMN is found, then no cell reselection to that given carrier will be triggered and thus no measurement related to the neighboring cells on that given carrier will be performed. If some of the PLMNs associated with that given carrier are accessible and others are not, then the UE will further determine which neighboring cells on that given carrier belong to the accessible PLMNs and then perform measurements related to these neighboring cells. The above additional-plmn-Identitylist information for each of intra-freq neighboring cells or inter-freq or inter-RAT neighboring cells is broadcast in the system information of the AP, e.g. LTE-Hi AP, which could be obtained by the AP during an interface (S1'/X3) setup procedure between the AP and an associated eNB.

Figure 9:
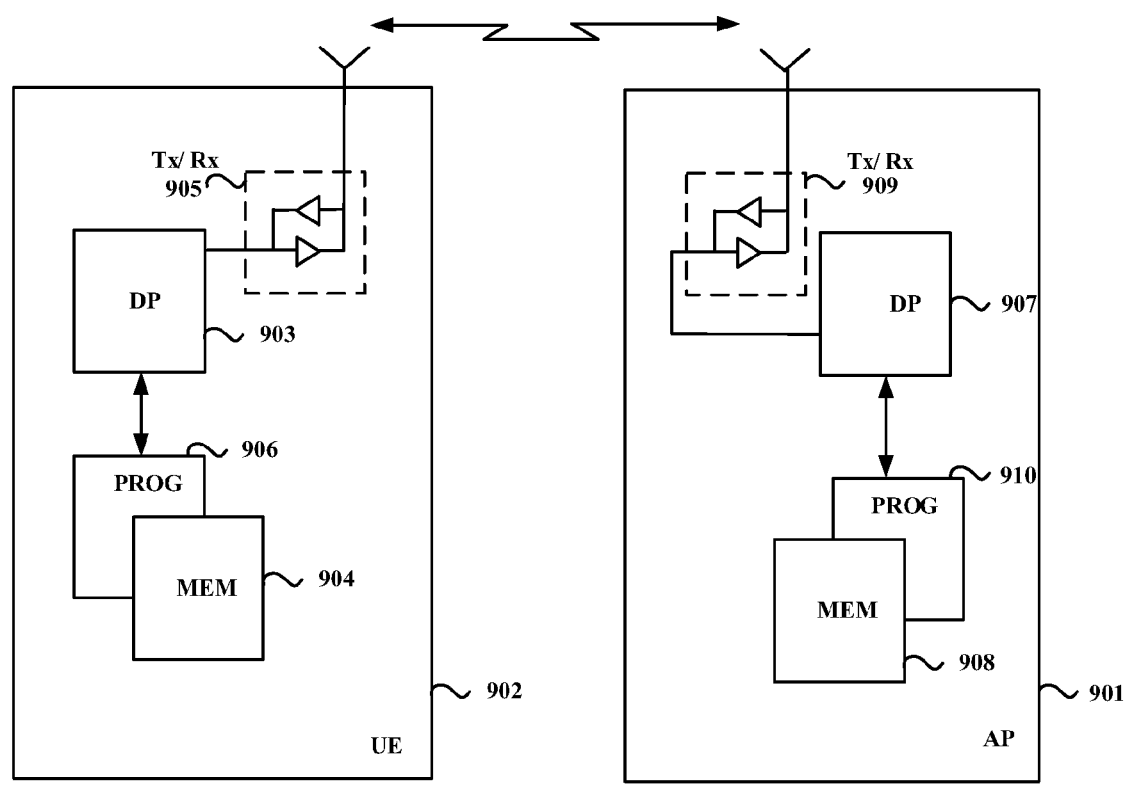
FIG. 9 is a simplified block diagram illustrating an access point and a user equipment that are suitable for use in practicing the exemplary embodiments of the present invention

FIG. 9 illustrates a simplified block diagram of an AP 901 and a UE 902 that are suitable for use in practicing the exemplary embodiments of the present invention. The UE 902 includes a data processor (DP) 903, a memory (MEM) 904 coupled to the DP 903, and a suitable RF transmitter TX and receiver RX 905 (which need not to be implemented in a same component) coupled to the DP 903. The MEM 904 stores a program (PROG) 906. The TX/RX 905 is for bidirectional wireless communications with the AP 901. Note that the TX/RX 905 has at least one antenna to facilitate communication; multiple antennas may be employed for multiple-input multiple-output MIMO communications in which case the UE 902 may have multiple TXs and/or RXs.

The AP 901 includes a data processor (DP) 907, a memory (MEM) 908 coupled to the DP 907, and a suitable RF transmitter TX and receiver RX 909 coupled to the DP 907. The MEM 908 stores a program (PROG) 910. The TX/RX 909 is for bidirectional wireless communications with the UE 902. Note that the TX/RX 909 has at least one antenna to facilitate communication. The AP 901 may be coupled via a data path to one or more external networks or systems, such as the internet, for example.

At least one of the PROGs 906 and 910 is assumed to include program instructions that, when executed by the associated DPs 903 and 907, enable the UE 902 and AP 901 to operate in accordance with the exemplary embodiments of this invention, as discussed herein with the methods 200 or 300.

In general, the various embodiments of the UE 902 can include, but are not limited to, cellular phones, personal digital assistants (PDAs) having wireless communication capabilities, portable computers having wireless communication capabilities, image capture device such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of the present invention may be implemented by computer software executable by one or more of the DPs 903, 907 of the UE 902 and the AP 901, or by hardware, or by a combination of software and hardware.

The MEMs 904 and 908 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the AP 901 or UE 902, there may be several physically distinct memory units in the AP 901 or UE 902. The DPs 903 and 907 may be of any type suitable to the local technical environment, and may include one or more of general purpose computers, special purpose computers, microprocessors, digital signal processors (DSPs) and processors based on multicore processor architecture, as non limiting examples. Either or both of the UE 902 and the AP 901 may have multiple processors, such as for example an application specific integrated circuit chip that is slaved in time to a clock which synchronizes the main processor.

Although the above description is based on E-UTRAN, LTE-Hi, and AP, it should not be construed as limiting the spirit and scope of the present invention. The idea and concept can be generalized to also cover normal E-UTRAN macro layout, HetNet deployments and other deployments in which RAN sharing is used. In addition, the examples of ASN.1 are merely examples for illustrating how to implement the idea in E-UTRAN and should not be construed as limiting.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory apparatus like a RAM (random access memory) or a ROM (read only memory).

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

LIST OF ABBREVIATIONS

3GPP 3rd generation partnership project
AP access point
ASN.1 abstract syntax notation one
BCCH broadcast control channel
BS base station
CDMA code division multiple access
DP data processor
DSP digital signal processor
eNB evolved Node-B
E-UTRAN evolved UMTS terrestrial radio access network
EDGE enhanced data rates for GSM evolution
GERAN GSM/EDGE radio access network
GSM global system for mobile communications
HPLMN home public land mobile network
IE information element
LTE long term evolution
LTE-Hi LTE hotspot indoor
PDA personal digital assistant
PLMN public land mobile network
RAN radio access network
RAT radio access technology
UE user equipment
USIM universal subscriber identity module
UTRAN universal terrestrial radio access network
RAM random access memory
ROM read only memory
SIM subscriber identity module
HetNet heterogeneous network

What is claimed is:

1. An apparatus for wireless communications, comprising:
   a processor; and
   at least one memory including program code that, when executed by the processor, causes the apparatus to:
   receive system information from a network node that is shared by two or more operator networks, wherein the system information comprises first information associated with at least one operator network related to one or more neighboring cells of the apparatus;
   determine whether there is an operator network accessible to the apparatus in the at least one operator network, based at least on the first information;
   in an instance in which a single carrier of the one or more neighboring cells belongs to more than one operator network, of which at least one operator network is accessible to the apparatus and at least one operator network is inaccessible to the apparatus:
  determine which neighboring cells on said single carrier belong to the at least one accessible operator network based at least in part on the first information, and
  perform cell detection and measurements related to the neighboring cells on said single carrier that belong to the at least one accessible operator network; and
  perform a cell reselection procedure only when one or more accessible operator networks are determined.

2. The apparatus according to claim 1, wherein the cell reselection procedure comprises performing cell detection and measurements related to carriers of the one or more neighboring cells that belong to the one or more accessible operator networks.

3. The apparatus according to claim 1, wherein the first information comprises, for each of carriers of the one or more neighboring cells, a list of operator networks to which a corresponding one of the carriers belongs.

4. The apparatus according to claim 3, wherein the program code when executed by the processor, causes the apparatus further to:
  determine whether there is an operator network accessible to the apparatus for each of the carriers, respectively and
  only when one or more accessible operator networks for a respective one of the carriers are determined, perform the cell reselection procedure to neighboring cells on said respective one of the carriers.

5. The apparatus according to claim 3 wherein the first information further comprises second information indicating an association between each of the neighboring cells on each of the carriers and the at least one operator network.

6. The apparatus according to claim 3, wherein said carriers comprises an intra-freq carrier, the intra-freq carrier being of a same frequency as a current serving carrier frequency for the apparatus.

7. The apparatus according to claim 3, wherein the system information further comprises a list of inter-freq carrier frequencies, and said carriers comprise the inter-freq carriers, the inter-freq carrier being of a different frequency from a current serving carrier frequency for the apparatus.

8. The apparatus according to claim 3, wherein the system information further comprises a list of inter-RAT carrier frequencies, and said carriers comprise the inter-RAT carriers.

9. The apparatus according to claim 1, wherein the first information comprises third information indicating an association between each of the neighboring cells on a single carrier and the at least one operator network.

10. The apparatus according to claim 9, wherein the system information further comprises a list of intra-freq neighboring cells, and said single carrier comprises an intra-freq carrier.

11. The apparatus according to claim 9, wherein the system information further comprises a list of inter-freq neighboring cells, and said single carrier comprises each of inter-freq carriers.

12. The apparatus according to claim 1, wherein the first information is obtained by the network node when interfaces between the network node and neighboring base stations within the at least one operator network are setup.

13. The apparatus according to claim 12, wherein the program code when executed by the processor, causes the apparatus further to determine whether the identity of one operator network of the at least one operator network is included in a list of allowed operator networks maintained in the apparatus.

14. A method for wireless communications, comprising:
  receiving system information from a network node that is shared by two or more operator networks, wherein the system information comprises first information associated with at least one operator network related to one or more neighboring cells;
  determining whether there is an operator network that is accessible in the at least one operator network, based at least on the first information;
  in an instance in which a single carrier of the one or more neighboring cells belongs to more than one operator network, of which at least one operator network is accessible and at least one operator network is inaccessible:
    determining which neighboring cells on said single carrier belong to the at least one accessible operator network based at least in part on the first information, and
    performing cell detection and measurements related to the neighboring cells on said single carrier that belong to the at least one accessible operator network; and
  performing a cell reselection procedure only when one or more accessible operator networks are determined.

15. The method according to claim 14, wherein the first information comprises, for each of carriers of the one or more neighboring cells, a list of operator networks to which a corresponding one of the carriers belongs.

16. The method according to claim 15, further comprising:
  determining whether there is an operator network that is accessible for each of the carriers, respectively and
  only when one or more accessible operator networks for a respective one of the carriers are determined, performing the cell reselection procedure to neighboring cells on said respective one of the carriers.

17. The method according to claim 15 wherein the first information further comprises second information indicating an association between each of the neighboring cells on each of the carriers and the at least one operator network.

18. The method according to claim 14, wherein the first information is obtained by the network node when interfaces between the network node and neighboring base stations within the at least one operator network are setup.

19. The method according to claim 18, further comprising determining whether the identity of one operator network of the at least one operator network is included in a list of allowed operator networks that is maintained.

* * * * *